United States Patent
Tu

(10) Patent No.: US 7,822,753 B2
(45) Date of Patent: Oct. 26, 2010

(54) METHOD FOR DISPLAYING SEARCH RESULTS IN A BROWSER INTERFACE

(75) Inventor: Pei-Hsuan Tu, Taipei (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 353 days.

(21) Appl. No.: 12/045,710

(22) Filed: Mar. 11, 2008

(65) Prior Publication Data

US 2009/0234828 A1 Sep. 17, 2009

(51) Int. Cl.
G06F 17/30 (2006.01)

(52) U.S. Cl. .................. 707/751; 707/755; 707/767; 707/768; 707/771; 705/14.6; 705/14.53; 705/347

(58) Field of Classification Search .............. 707/755, 707/767, 771, 5–6, 768; 705/14.6, 347; 725/28
See application file for complete search history.

(56) References Cited

U.S. PATENT DOCUMENTS

| | | | |
|---|---|---|---|
| 6,697,800 B1 * | 2/2004 | Jannink et al. ................ 1/1 |
| 7,668,821 B1 * | 2/2010 | Donsbach et al. ............. 705/27 |
| 7,689,682 B1 * | 3/2010 | Eldering et al. ............. 709/223 |
| 2002/0059094 A1 * | 5/2002 | Hosea et al. ................... 705/10 |
| 2003/0110056 A1 * | 6/2003 | Berghofer et al. ............. 705/1 |
| 2004/0172267 A1 * | 9/2004 | Patel et al. ...................... 705/1 |
| 2005/0256796 A1 * | 11/2005 | Haga et al. ..................... 705/37 |
| 2006/0059147 A1 * | 3/2006 | Weiss et al. ..................... 707/6 |
| 2006/0195515 A1 * | 8/2006 | Beaupre et al. ............. 709/203 |
| 2006/0195516 A1 * | 8/2006 | Beaupre ....................... 709/203 |
| 2006/0195790 A1 * | 8/2006 | Beaupre et al. ............. 715/727 |
| 2007/0174172 A1 * | 7/2007 | Enand et al. .................... 705/37 |
| 2008/0077574 A1 * | 3/2008 | Gross ............................. 707/5 |
| 2008/0120288 A1 * | 5/2008 | Guan et al. ..................... 707/5 |
| 2008/0120339 A1 * | 5/2008 | Guan et al. ............. 707/104.1 |
| 2008/0147424 A1 * | 6/2008 | Rowan et al. ................... 705/1 |
| 2008/0172689 A1 * | 7/2008 | Feder et al. .................... 725/28 |
| 2008/0189733 A1 * | 8/2008 | Apostolopoulos ............ 725/28 |
| 2009/0063408 A1 * | 3/2009 | Bao et al. ....................... 707/3 |
| 2009/0144780 A1 * | 6/2009 | Toebes et al. ................. 725/87 |
| 2009/0150340 A1 * | 6/2009 | Lhuillier et al. ................ 707/3 |
| 2009/0177691 A1 * | 7/2009 | Manfredi et al. ......... 707/104.1 |

* cited by examiner

*Primary Examiner*—Hung T Vy
*Assistant Examiner*—Hanh B Thai
(74) *Attorney, Agent, or Firm*—Winston Hsu; Scott Margo; Min-Lee Teng

(57) ABSTRACT

A level of affinity between a first user and many other users is considered when prioritizing content display when browsing, and ratings display when searching for programs in an electronic program guide or in a browser interface of a playback software application. Ratings from users who have high affinity with the first user are shown with priority over ratings from users who have low affinity with the first user. And, when browsing, programs rated highly by users having high affinity with the first user are shown with priority over programs rated poorly by the users having high affinity with the first user, and programs rated highly by users having low affinity with the first user.

19 Claims, 11 Drawing Sheets

| My Movie Collection | User: Alice | | | | |
|---|---|---|---|---|---|
| Movie Title | Global Rating | My Rating | View Date | Genre ▽ | Detail |
| Batman Begins | ☆☆☆☆☆ | ★★★★☆ | 2007/06/01 | Action | 🔍 |
| The Da Vinci Code | ☆☆☆☆☆ | ★★★★★ | 2004/06/01 | Action | 🔍 |
| The Departed | ☆☆☆☆☆ | ★★★★☆ | 2002/06/01 | Action | 🔍 |
| Fantastic Four | ☆☆☆☆☆ | ★★★★☆ | 2001/06/01 | Action | 🔍 |
| Harry Potter 4 | ☆☆☆☆☆ | ★★★★☆ | 2007/08/10 | Action | 🔍 |

FIG. 7

| My Movie Collection | User: Benny | | | | |
|---|---|---|---|---|---|
| Movie Title | Global Rating | My Rating | View Date | Genre ▽ | Detail |
| Batman Begins | ★★★★★ | ★★★☆☆ | 2007/06/01 | Action | 🔍 |
| The Da Vinci Code | ★★★★★ | ★★★★☆ | 2004/06/01 | Action | 🔍 |
| The Departed | ★★★★★ | ★★☆☆☆ | 2002/06/01 | Action | 🔍 |
| Fantastic Four | ★★★★★ | ★★★☆☆ | 2001/06/01 | Action | 🔍 |
| Harry Potter 4 | ★★★★★ | ★★☆☆☆ | 2007/08/10 | Action | 🔍 |

FIG. 8

| My Movie Collection | User:CoCo | | | | | |
|---|---|---|---|---|---|---|
| Movie Title | Global Rating | My Rating | View Date | Genre ▽ | | Detail |
| Batman Begins | ☆☆☆☆☆ | ★★★☆☆ | 2007/06/01 | Action | | 🔍 |
| The Da Vinci Code | ☆☆☆☆☆ | ★★★★☆ | 2004/06/01 | Action | | 🔍 |
| The Departed | ☆☆☆☆☆ | ★★★☆☆ | 2002/06/01 | Action | | 🔍 |
| Fantastic Four | ☆☆☆☆☆ | ★★★★★ | 2001/06/01 | Action | | 🔍 |
| Harry Potter 4 | ☆☆☆☆☆ | ★★★★☆ | 2007/08/10 | Action | | 🔍 |

FIG. 9

| Search Rating :"Harry Potter 4" | | User : JoJo | | |
|---|---|---|---|---|
| Rating | User Name | Comment | Affinity ▽ | Upload Date |
| ☆☆☆☆☆ | Alice | more... | 95% | 2007/08/11 |
| ☆☆☆☆☆ | CoCo | more... | 90% | 2007/08/03 |
| ☆☆☆☆☆ | David | more... | 80% | 2007/08/22 |
| ☆☆☆☆☆ | Eva | more... | 77% | 2007/08/12 |
| ☆☆☆☆☆ | Benny | more... | 63% | 2007/08/25 |
| ☆☆☆☆☆ | FiFi | more... | 40% | 2007/08/12 |
| All (120) Page 1 2 3 4 5 6 7 8 ▷ | | | | |

FIG. 10

METHOD FOR DISPLAYING SEARCH RESULTS IN A BROWSER INTERFACE

BACKGROUND OF THE INVENTION

1. Field of the Invention

The present invention relates to methods for displaying search results, and more particularly, to a method for displaying search results from a plurality of users according to affinity between each of the plurality of users and a user performing a search.

2. Description of the Prior Art

Entertainment, once dominated by live performance on stage, has shifted dramatically to recorded and broadcast media, such as film, television, radio, compact discs, digital versatile discs, high definition media, and even Internet-based broadcasts. Where audiences once traveled significant distances to view theatrical and musical performances, and still do to a certain extent, now consumers of digital entertainment can access the same performances through the Internet, as well as on their own television set.

Typically, viewers decide to view entertainment programs in one of two ways. The viewer can actively select a program, usually which they own, or for which they know a broadcast schedule thereof. Or, the viewer can browse channels that are broadcasting programs, and choose one that appears desirable for viewing. In the latter situation, an electronic program guide (EPG) can be very beneficial to the viewer, as the EPG offers the viewer a preview of basic information about a variety of programs currently broadcasting on the channels, and also about programs scheduled to broadcast later on the channels. The EPG may display a list of titles, main actors/actresses, synopses, and parental guidance ratings for each program.

Beyond the basic information mentioned above, satisfaction ratings and viewer commentary may also be provided by the EPG, which give the viewer an opportunity to see what real people think about the program they are thinking about viewing. This type of information is often more trustworthy than the synopsis provided by the creator of the program, which is obviously biased to shed favorable light on the program. However, satisfaction ratings and comments from other viewers often vary greatly from those who enjoyed the program to those who despised the program. Further, many viewers leave ratings and comments without having seen the program. And, the satisfaction ratings are often sorted by date, which means that relatively meaningful ratings may be pushed down very far in the list. Finally, no playback application currently has rating comparison and search functionality.

SUMMARY OF THE INVENTION

According to an embodiment of the present invention, a method of displaying search results of a search based on a ratings history in a browser interface of a playback software application comprises recording at least one first rating provided by a first user corresponding to a plurality of first content, and a plurality of second ratings provided by a plurality of second users corresponding to the plurality of first content, and displaying at least one searched rating provided by the plurality of second users corresponding to second content according to a level of affinity between the first user and each of the plurality of second users when the first user searches for the second content. The level of affinity is determined according to the plurality of first ratings and the plurality of second ratings for the first content.

According to another embodiment of the present invention, a method of displaying search results of a search based on a ratings history in a browser interface comprises providing a rating history including a plurality of first ratings provided by a first user and a plurality of second users corresponding to a first content, and a plurality of second ratings provided by the second users corresponding to a second content. When the first user queries the ratings history for ratings on the second content, level of affinity between the first user and each of the plurality of second users is determined by comparing the ratings of the first user and the second users corresponding to the first content, and a group of second users having high level of affinity with the first user is determined. At least one of the ratings of the group of second users corresponding to the second content is then displayed.

According to yet another embodiment of the present invention, a method of displaying information about digital programs in a browser interface comprises determining a level of affinity between a first user and each of a plurality of second users, and displaying information about a plurality of digital programs in the browser interface according to the level of affinity between the first user and each of the plurality of second users.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 6-9 illustrate ratings provided by a first user and second users.

FIG. 10 illustrates display of ratings information based on affinity.

DETAILED DESCRIPTION

In the following description of the present invention, "ratings" refers to satisfaction ratings or evaluation results, which indicate a viewer's reaction to, or evaluation of, content being rated, as opposed to parental guidance ratings, which indicate a recommended age level for viewing the content based on various factors, such as violence, adult content, and nudity/sexuality.

In the present invention, a large number of viewers may provide ratings or evaluation results for content that they have previously viewed. The ratings or evaluation results may be stored in a database owned by a provider of the EPG, or stored in a server of a website, e.g. www.moovielive.com. A playback software application may also include a browser interface or show a dialogue window for users to select a rating for a certain program when the user is watching the program or movie. Using such ratings data, a level of affinity between users can be calculated according to various algorithms. It can roughly be assumed that a first user will provide relatively positive ratings for a first set of content, and relatively negative ratings for a second set of content. Like the first user, a second user may provide relatively positive ratings for the first set of content, and relatively negative ratings for the second set of content. In this case, it can be said that the first user and the second user have high affinity. On the other hand, if a third user provides relatively negative ratings for the first set of content, and relatively positive ratings for the second set of content, the third user and the first user, and likewise the third user and the second user, can be said to have low affinity.

The present invention provides two methods for utilizing a level of affinity between two or more users to display information about programs. The first method is utilized when a first user searches for information about particular content. In this case, the present invention prioritizes ratings from other users with high affinity to the first user regarding the particular program being searched for.

A second method is utilized as the first user is browsing the EPG. In this case, the present invention suggests programs, i.e. prioritizes display of information about the programs, which are highly rated by users having high affinity with the first user.

Figure 1A:
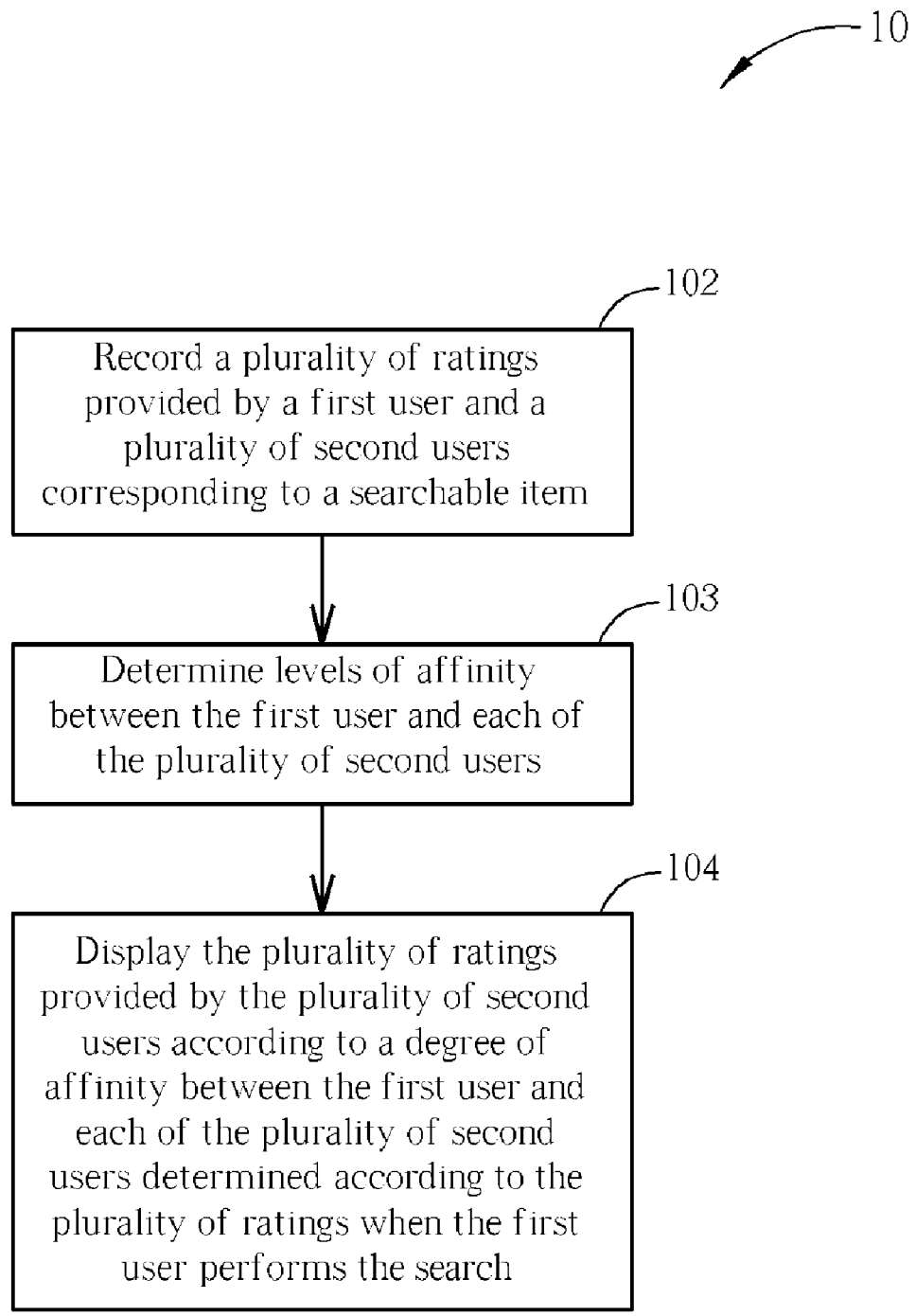
FIG. 1A is a flowchart of a method of displaying search results according to the present invention.
Figure 1B:
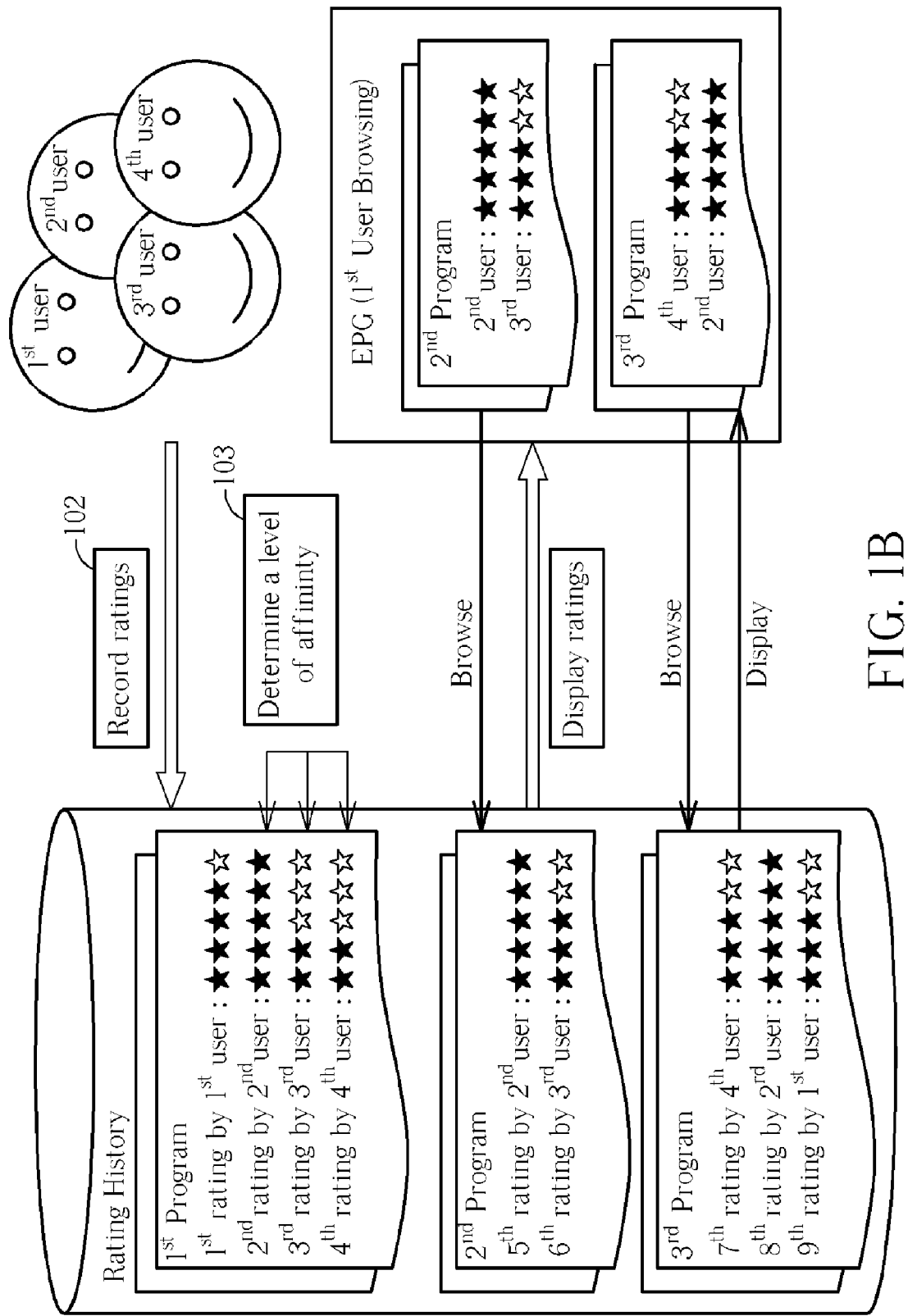
FIG. 1B illustrates the method of FIG. 1A.

Please refer to FIGS. 1A and 1B, which illustrate a process 10 according to the first method of the present invention, namely a method of displaying search results. The first method could be used in an EPG system, and comprises the following steps.

In Step 102, a plurality of first ratings provided by a first user are recorded corresponding to a plurality of first content, and a plurality of second ratings provided by a plurality of second users are recorded corresponding to the plurality of first content. This is shown in a "Rating History" under "$1^{st}$ Program" in FIG. 1B. As shown, the first user provides a rating of four stars for the $1^{st}$ Program (or content), and a $2^{nd}$ user, a $3^{rd}$ user, and a $4^{th}$ user, i.e. the plurality of second users, provide ratings of five stars, two stars, and two stars for the $1^{st}$ Program, respectively. In Step 103, the ratings are compared and levels of affinity between the first user and each of the plurality of second users are determined. The level of affinity is determined according to comparison result of the plurality of first ratings and the plurality of second ratings when the first user searches for the second program or content. The comparison can be made by comparing keywords, e.g. "excellent," "good," "bad," "watch again," "must see," or "must buy," etc., of the rating or evaluation, or by comparing level numbers or number of stars (1, 2, 3, 4), etc. The comparison may also be made by comparing view counts or view rates. In Step 104, a plurality of third ratings provided by the plurality of second users corresponding to second program or content are displayed according to the level of affinity between the first user and each of the plurality of second users. As shown in FIG. 1B, the $2^{nd}$ user and the $3^{rd}$ user provide ratings of five stars and three stars, respectively, for a $2^{nd}$ Program, and the $4^{th}$ user and the $2^{nd}$ user provide ratings of three stars and five stars, respectively, for a $3^{rd}$ Program. The $2^{nd}$ Program and the $3^{rd}$ Program can be considered the second content of Step 104. As the $1^{st}$ user browses the EPG for the $2^{nd}$ Program and the $3^{rd}$ Program, the EPG then displays the information obtained from the Rating History.

In one embodiment, in Step 102, the plurality of first ratings provided by the first user corresponding to the plurality of first content is recorded, preferably stored in a database. This could be accomplished by establishing a list of the first content that the first user has rated in the database. The first content, while preferably television programs, could also be extended to include movies, books, music, or other ratable items. Further, this recording could occur over a significant period of time, and is an ongoing process. Likewise, the plurality of second ratings provided by the plurality of second users is recorded in the database over time. As mentioned above, the recorded first ratings and second ratings can then be used to calculate respective levels of affinity between the first user and each of the plurality of second users, in Step 103. Of course, as mentioned above, the users of the plurality of second users will have varying levels of affinity with the first user, and the levels of affinity between each user of the plurality of second users and the plurality of first users will most likely change, or be refined, over time, as more ratings are provided by the first user and each of the plurality of second users.

In Step 103, the level of affinity may be determined according to the plurality of first ratings and the plurality of second ratings for the first content. For example, if the first user does not have a rating for a second program, in a previous history showing that a first rating provided by the first user for a first program is approximately equal to a second rating provided by one of the plurality of second users, the level of affinity between the first user and the one of the plurality of second users is determined to be higher. Thus, when the first user browses the ratings of the second program, referring back to FIG. 1B, the affinity between the $1^{st}$ user and the $2^{nd}$ user for the second program may be determined to be higher than the affinity between the $1^{st}$ user and each of the other users, such as $3^{rd}$ user.

In Step 104, the first user searches for the second content, which could preferably be a program, but could also be a movie, a book, or another ratable item. Based on the levels of affinity between the first user and each of the plurality of second users, the plurality of third ratings (ratings for the $2^{nd}$ Program and ratings for the $3^{rd}$ Program in FIG. 1B) provided by the plurality of second users (the $2^{nd}$ user, the $3^{rd}$ user, and the $4^{th}$ user of FIG. 1B) are displayed in the browser interface, such as the EPG or the web browser. For example, the plurality of third ratings for the second content can be displayed in descending order of affinity with the first user. In FIG. 1B, a set of third users (the $2^{nd}$ user and the $4^{th}$ user in FIG. 1B) of the plurality of second users provide fourth ratings ($5^{th}$ rating and $7^{th}$ rating in FIG. 1B), which may be part of the plurality of third ratings. Then, the fourth ratings provided by the set of third users of the plurality of second users that have high affinity with the first user may be displayed before fifth ratings ($6^{th}$ rating and $8^{th}$ rating of FIG. 1B) of the plurality of third ratings provided by a set of fourth users (the $3^{rd}$ user and the $2^{nd}$ user) of the plurality of second users that have low affinity with the first user. This final search result is shown in FIG. 1B under the browser interface, such as "EPG ($1^{st}$ User Browsing)", in which the ratings for the $2^{nd}$ Program and the $3^{rd}$ Program are shown. For the $2^{nd}$ Program, when the first user has not provided the rating, according to the history of the first program, the $2^{nd}$ user has higher affinity with the $1^{st}$ user than the $3^{rd}$ user has with the $1^{st}$ user, so the $5^{th}$ rating by the $2^{nd}$ user is shown before the $6^{th}$ rating by the $3^{rd}$ user. On the other hand, when the first user has provided another rating ($9^{th}$ rating by $1^{st}$ user, 3 stars) for the $3^{rd}$ Program, the $4^{th}$ user has higher affinity with the $1^{st}$ user than the $2^{nd}$ user has with the $1^{st}$ user, so the $7^{th}$ rating is shown before the $8^{th}$ rating. In this way, the first user can get opinions on the $2^{nd}$ Program and the $3^{rd}$ Program provided by other users who have similar taste.

Figure 2:
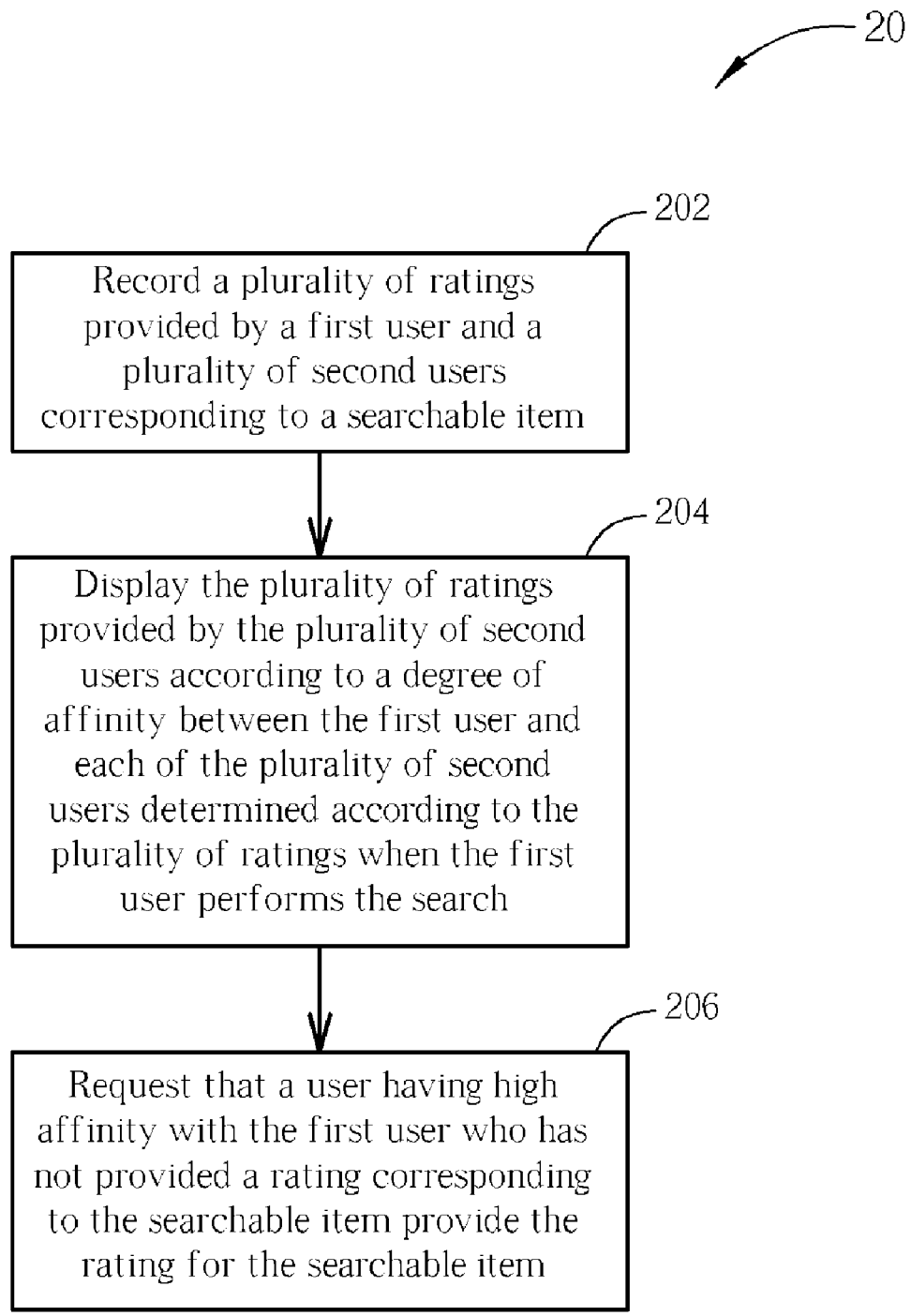
FIG. 2 is a flowchart of a second embodiment of the method of displaying search results according to the present invention.

Please refer to FIG. 2, which is a flowchart of a process 20 according to a second embodiment of the first method of the present invention. Steps 202 and 204 correspond to Steps 102 and 104 of the preferred embodiment, so description thereof is not repeated. In the second embodiment, it is likely that when the first user searches for the second content, not every user of the plurality of second users that has high affinity with the first user will have left a rating for the second content. As a further improvement to the first method, if a user of the plurality of second users that has high affinity with the first user has not provided a rating for the second content, the present invention can also send a request for a rating to the user having high affinity with the first user when the first user searches for the second content (Step 206). In this way, the present invention helps the first user find more opinions from other users with similar preferences.

Figure 6:

Please refer to FIGS. 6-10, which illustrate an example of the above-described methods. Please note that, FIGS. 6~10 are examples to be displayed in a browser interface by a playback software application by implementing the methods of the present invention. In FIG. 6, the first user, "Jojo," has provided first ratings for four different movies: Batman Begins, The Da Vinci Code, The Departed, and The Fantastic Four, which ratings are shown under a heading "My Rating". The four different movies can be considered the first content mentioned above. In FIGS. 7-9, the second users, "Alice," "Benny," and "CoCo", also provide second ratings for the four movies, as well as for a fifth movie: Harry Potter 4. The fifth movie can be considered the second content mentioned above. Thus, the ratings history is provided. As shown in FIGS. 6-9, a "Global Rating" field can also be displayed in the present invention. The Global Rating can be an average rating of all users for the content being rated. Of course, many algorithms could be used to calculate the average rating, e.g. a simple average, an average having emphasis on more recent ratings, or an average with emphasis on ratings from other users with high affinity.

In FIG. 10, the first user, Jojo, has performed a search for ratings on Harry Potter 4, namely the second content. The ratings for the second content are arranged in order based on the second users' affinity with Jojo. Thus, the rating given by Alice, who has the highest affinity (95%) with Jojo, is shown first, followed by the ratings provided by CoCo, David, and so forth, in order of descending affinity.

Figure 3:
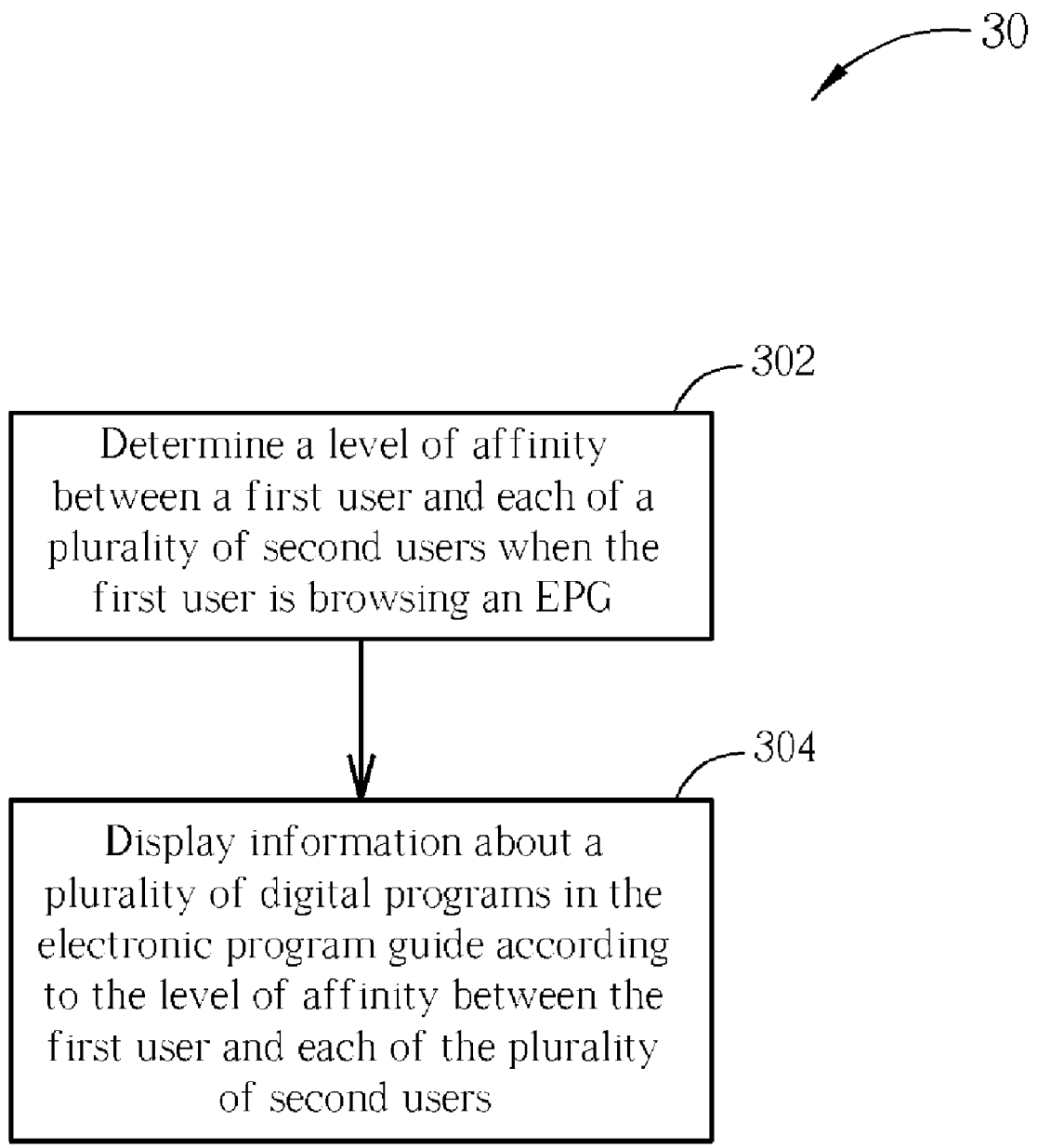
FIG. 3 is a flowchart of a method of displaying information about digital programs in an electronic program guide.

Please refer to FIG. 3, which is a flowchart of a process 30 according to the second method of the present invention. The process 30 can also be used in the EPG system, and comprises the following steps.

In Step 302, a level of affinity between a first user and each of a plurality of second users is determined. In Step 304, information about a plurality of digital programs in the electronic program guide is displayed according to the level of affinity between the first user and each of the plurality of second users.

In the process 30, the first user is browsing the EPG to find programs to view. Like mentioned above, the level of affinity between the first user and the plurality of second users is determined based on first ratings provided by the first user and second ratings provided by the plurality of second users. When the first user is browsing the EPG to find programs to view, the present invention suggests programs that are rated highly by users of the plurality of second users that have high affinity with the first user. In other words, and for example only, if a first program is highly rated by three users that have high affinity with the first user, but a second program is rated poorly by four other users that have high affinity with the first user, and a third program is rated highly, but by three users that have low affinity with the first user, the present invention will prioritize display of information about the first program over displaying information about the second program and the third program. Though the EPG is browsed in the method described above, any browser interface could be used in implementation of the method.

Figure 4:
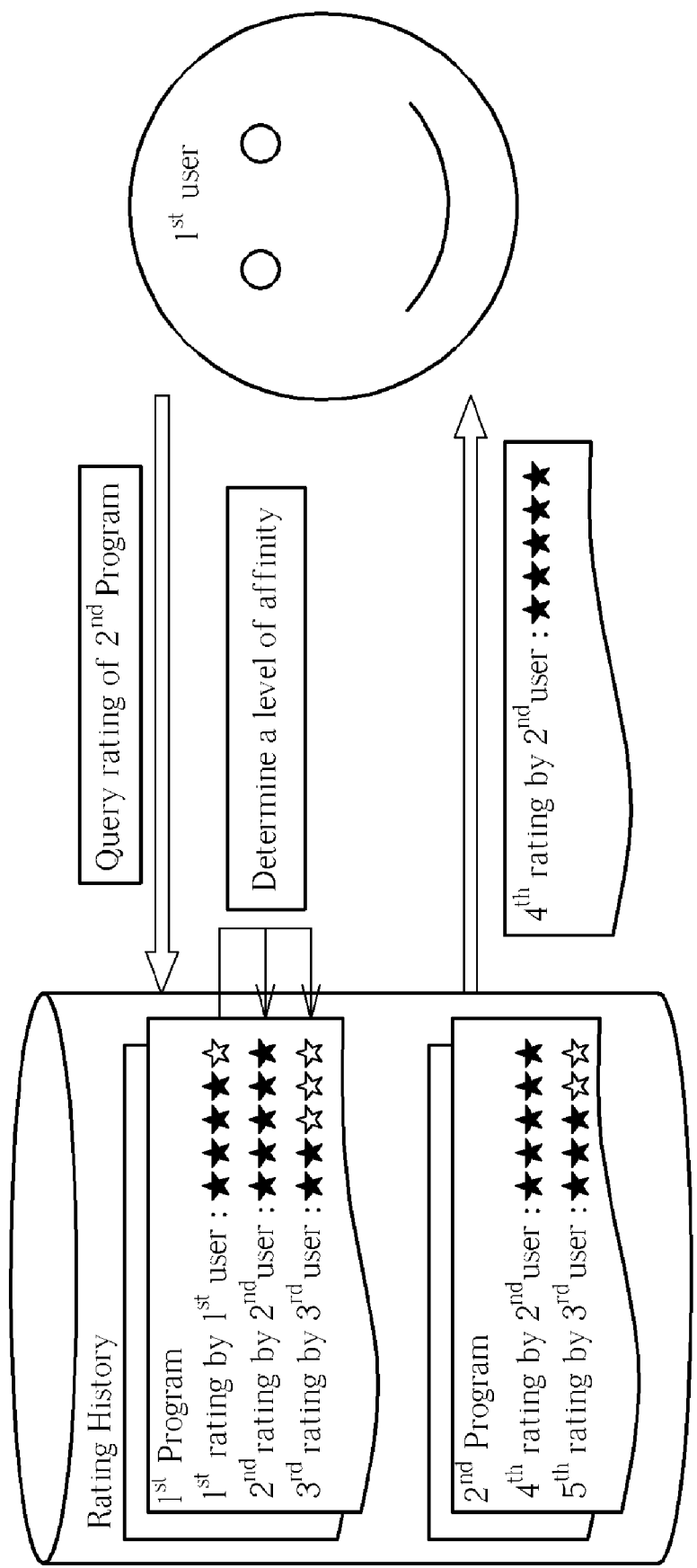
FIGS. 4 and 5 illustrate a process according to a third embodiment of the present invention.
Figure 5:
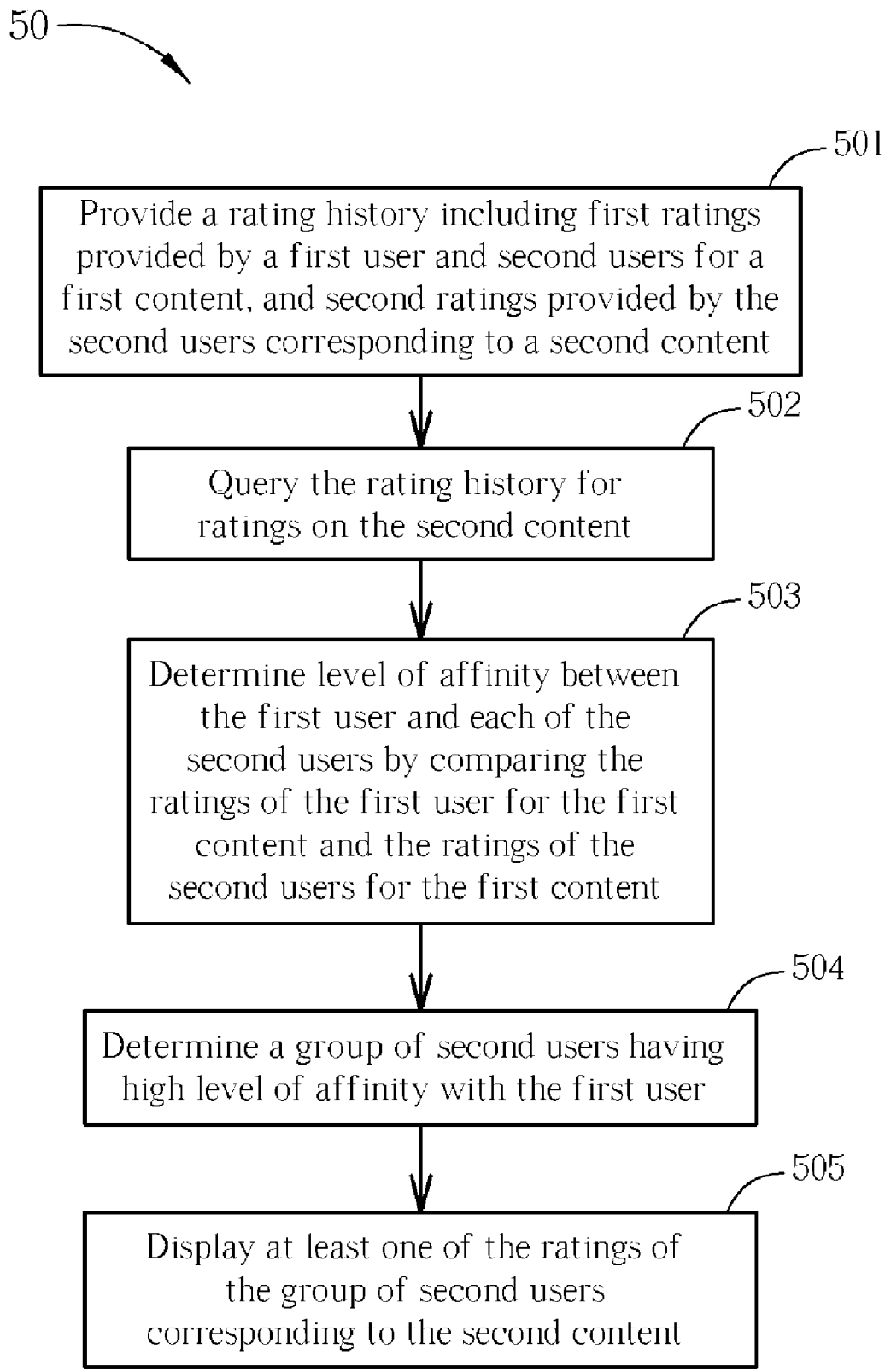

Please refer to FIGS. 4 and 5, which illustrate a process 50 according to a third embodiment of the present invention. In Step 501, a rating history is provided. The rating history comprises a plurality of first ratings provided by a first user and a plurality of second users for a first content. The rating history further comprises a plurality of second ratings provided by the plurality of second users for a second content. In Step 502, the rating history is queried for ratings on the second content. At this point, in Step 503, level of affinity between the first user and each of the second users is determined by comparing the ratings of the first user for the first content with the ratings of the second users for the first content. As shown in FIG. 4, based on the ratings provided for the $1^{st}$ Program, a $2^{nd}$ User has a higher affinity with the first user ($1^{st}$ User) than a $3^{rd}$ User has with the first user. And, in Step 504, a group of second users having high level of affinity with the first user is determined. As shown in FIG. 4, only the $2^{nd}$ User has a high level of affinity with the first user. Finally, in Step 505, at least one of the ratings of the group of second users corresponding to the second content is displayed. Thus, the $4^{th}$ rating provided by the $2^{nd}$ User is displayed back to the first user in response to the query.

Note that the present invention is not limited to the sequence illustrated in FIG. 5. For example, the steps 503 and 504 described above can be interchangeable. After the user queries ratings, the system can then determine the affinity level between users, or after the system has determined the affinity level, the user can then query ratings.

Of course, the methods described above, while described for use in EPG, could also be applied to other browser interfaces, such as online programming sites that display information about programs and provide search functions with ratings from users of the online programming sites. Or the methods described above could be applied to online stores that market products, such as songs, albums, books, or any other ratable item, like electronic products or home appliances. Any system that uses ratings or evaluation history to determine affinity between users, and prioritizes display of information based on the affinity between the users, is within the spirit of the present invention.

In conclusion, the present invention method allows the user effectively to filter out meaningful information, be it ratings or program titles, from a vast sea of information both quickly and efficiently. Not only does the present invention use the level of affinity to provide meaningful ratings and comments to the user, but it also uses the level of affinity to enhance browsing for the user. Thus, the present invention is able to provide rating comparison and search functionality.

Those skilled in the art will readily observe that numerous modifications and alterations of the device and method may be made while retaining the teachings of the invention.

What is claimed is:

1. A method of displaying search results of a search based on a ratings history in a browser interface of a playback software application comprising:

recording at least one first rating provided by a first user corresponding to a plurality of first content, and a plurality of second ratings provided by a plurality of second users corresponding to the plurality of first content on a server;

displaying at least one searched rating provided by the plurality of second users corresponding to second content according to a level of affinity between the first user and each of the plurality of second users when the first user searches for the second content on the server; and comparing the plurality of first ratings and the plurality of second ratings to determine the level of affinity between the first user and each of the plurality of second users;

wherein comparing the plurality of first ratings and the plurality of second ratings comprises comparing level numbers of the plurality of first ratings with level numbers of the plurality of second ratings;
wherein the level of affinity is determined by the server according to the plurality of first ratings and the plurality of second ratings for the first content; and
wherein displaying the plurality of third ratings according to the level of affinity between the first user and each of the plurality of second users comprises displaying fourth ratings of the plurality of third ratings provided by third users of the plurality of second users having high affinity with the first user before displaying fifth ratings of the plurality of third ratings provided by fourth users of the plurality of second users having low affinity with the first user.

2. The method of claim 1, wherein the browser interface is implemented in an electronic program guide.

3. The method of claim 1, wherein the browser interface is implemented in a web browser.

4. The method of claim 1, wherein the level of affinity between the first user and one of the plurality of second users is determined to be higher when a third rating provided by the first user for a third content is approximately equal to a fourth rating provided by the one of the plurality of second users for the third content.

5. The method of claim 1 further comprising requesting a user provide a rating for the second content when the user of the plurality of second users has a high level of affinity with the first user corresponding to the first content and has not provided a rating corresponding to the second content.

6. The method of claim 1, wherein the first content and the second content comprise a program, a movie, a book, an article, a forum, or music.

7. The method of claim 1 wherein comparing the plurality of first ratings and the plurality of second ratings further comprises comparing keywords of the plurality of first ratings with keywords of the plurality of second ratings.

8. The method of claim 1, wherein comparing the plurality of first ratings and the plurality of second ratings further comprises comparing view counts of the first users and the view counts of each of the plurality of second users of the first content.

9. The method of claim 1, wherein comparing the plurality of first ratings and the plurality of second ratings further comprises comparing view rates of the first users and the view rates of each of the plurality of the second users.

10. A method of displaying search results of a search based on a ratings history in a browser interface comprising:
providing a first content and a second content, playable by a playback software application;
providing a rating history on a server including a plurality of first ratings provided by a first user and a plurality of second users corresponding to the first content, and a plurality of second ratings provided by the second users corresponding to the second content;
when the first user queries the server for the ratings history for ratings on the second content, the server determining level of affinity between the first user and each of the plurality of second users by comparing the ratings of the first user and the second users corresponding to the first content, and determining a group of second users having high level of affinity with the first user; and
displaying at least one rating of the group of second users corresponding to the second content;
wherein comparing the ratings of the first user and the second users corresponding to the first content comprises comparing level numbers of the ratings of the first user with level numbers of the ratings of the second users; and
wherein the level of affinity between the first user and one of the plurality of second users is determined to be high when a difference between the first rating provided by the first user for the first content and the first rating provided by the one of the plurality of second users for the first content is low.

11. The method of claim 10, wherein the browser interface is implemented in an electronic program guide.

12. The method of claim 10, wherein the browser interface is implemented in a web browser.

13. The method of claim 10, wherein displaying at least one of the ratings of the group of second users corresponding to the second content comprises displaying the at least one of the ratings of the group of second users prioritized by the level of affinity.

14. The method of claim 10, further comprising displaying an average rating of the group of second users corresponding to the second content.

15. A method of displaying information about digital programs in a browser interface comprising:
determining a level of affinity between a first user and each of a plurality of second users by comparing ratings provided by the first user and ratings provided by the second users; and
displaying information about a plurality of digital programs in the browser interface according to the level of affinity between the first user and each of the plurality of second users;
wherein comparing the ratings provided by the first user and the ratings provided by the second users comprises comparing level numbers of the ratings provided by the first user with level numbers of the ratings provided by the second users; and
wherein the level of affinity between the first user and one of the plurality of second users is determined to be high when a difference between a first rating provided by the first user for a content and a second rating provided by the one of the plurality of second users for the content is low.

16. The method of claim 15, wherein the browser interface is implemented in an electronic program guide.

17. The method of claim 15, wherein the browser interface is implemented in a web browser.

18. The method of claim 15, wherein displaying the information about the plurality of digital programs in the browser interface according to the level of affinity between the first user and each of the plurality of second users comprises displaying a first digital program rated highly by one of the plurality of second users having high affinity with the first user before displaying a second digital program rated poorly by the one of the plurality of second users.

19. The method of claim 15, wherein displaying the information about the plurality of digital programs in the browser interface according to the level of affinity between the first user and each of the plurality of second users comprises displaying a first digital program rated highly by a third user of the plurality of second users before displaying a second digital program rated highly by a fourth user of the plurality of second users when the level of affinity between the first user and the third user is higher than the level of affinity between the first user and the fourth user.

* * * * *